Feb. 5, 1946.  G. F. GOGA  2,394,168
MONORAIL TRACTOR
Filed Feb. 26, 1943  2 Sheets-Sheet 1

INVENTOR
George F. Goga
BY
Powers & Gary
ATTORNEYS

Feb. 5, 1946.   G. F. GOGA   2,394,168
MONORAIL TRACTOR
Filed Feb. 26, 1943   2 Sheets-Sheet 2
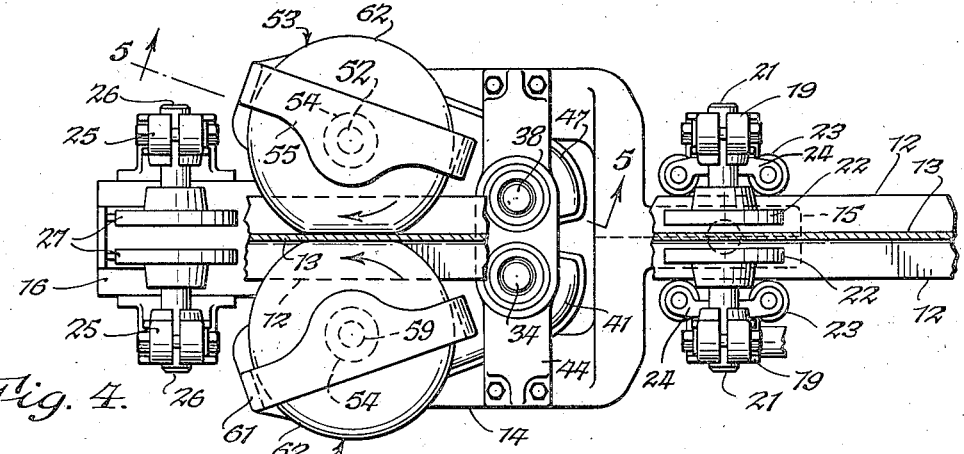
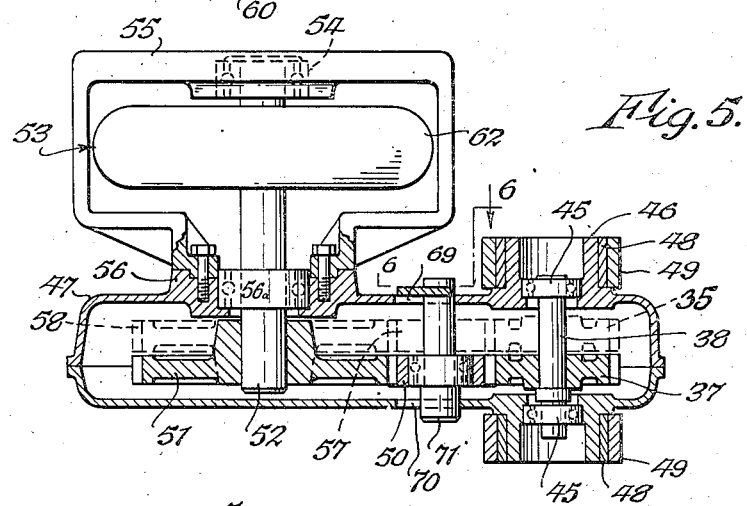
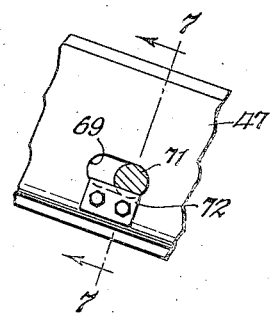
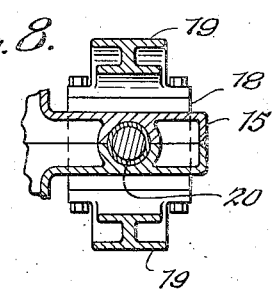
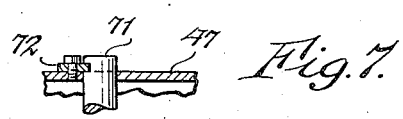
INVENTOR
George F. Goga
BY
Powers & Gary
ATTORNEYS Patented Feb. 5, 1946

2,394,168

UNITED STATES PATENT OFFICE 2,394,168

MONORAIL TRACTOR

George F. Goga, Kenmore, N. Y.

Application February 26, 1943, Serial No. 477,287

13 Claims. (Cl. 105—154)

This invention relates to improvements in tractors of the kind employed in connection with overhead monorail carrier systems.

One object of the invention is to provide a tractor which is so designed that the required traction is obtained independently of the weight of the load to be transferred and without adding in any substantial degree to such load or increasing the load upon the supporting wheels or the flange along which said wheels ride.

A further object is to provide a tractor which is adapted especially for use in connection with standard structural shapes and which is so constructed that wearing of its wheels and wearing and peening of the load supporting flanges of such shapes will be minimized.

A still further object is to provide a tractor which, without subjecting such sections of the supporting rail to stresses of any substantial magnitude, will negotiate switch crossings and transfer junctions.

A still further object is a tractor wherein provision is made for obtaining with facility a wide range of speeds for each speed of the particular motor by which the tractor may be powered.

A still further object is to provide a tractor which is adapted for high speed travel and rapid acceleration and deceleration, this object contemplating a tractor which is so balanced and which is driven in such a manner that swaying of the tractor, with attendant flexing, stressing, and wearing down of the load supporting rail, is avoided.

A still further object is a tractor wherein provision is made for obtaining the required traction in such a manner that standard pneumatic tires may be employed in connection with the drive wheels without the hazard of such tires being subjected to forces of a magnitude to be destructive.

A still further object is to provide a novel construction and arrangement of the parts of the tractor, whereby to enable the latter to be installed with facility and to obtain simplicity and compactness in design.

The invention is illustrated in the accompanying drawings in which:

Figure 4 is a top view of the tractor, the supporting rail, to the extent that it is indicated, being in section.

Figure 5 is an enlarged section taken along line 5—5 of Figure 4.

Figure 6 is a detail section taken along line 6—6 of Figure 5.

Figure 7 is a detail section taken along line 7—7 of Figure 6.

Figure 8 is a fragmentary section taken along line 8—8 of Figure 1.

Figure 1:
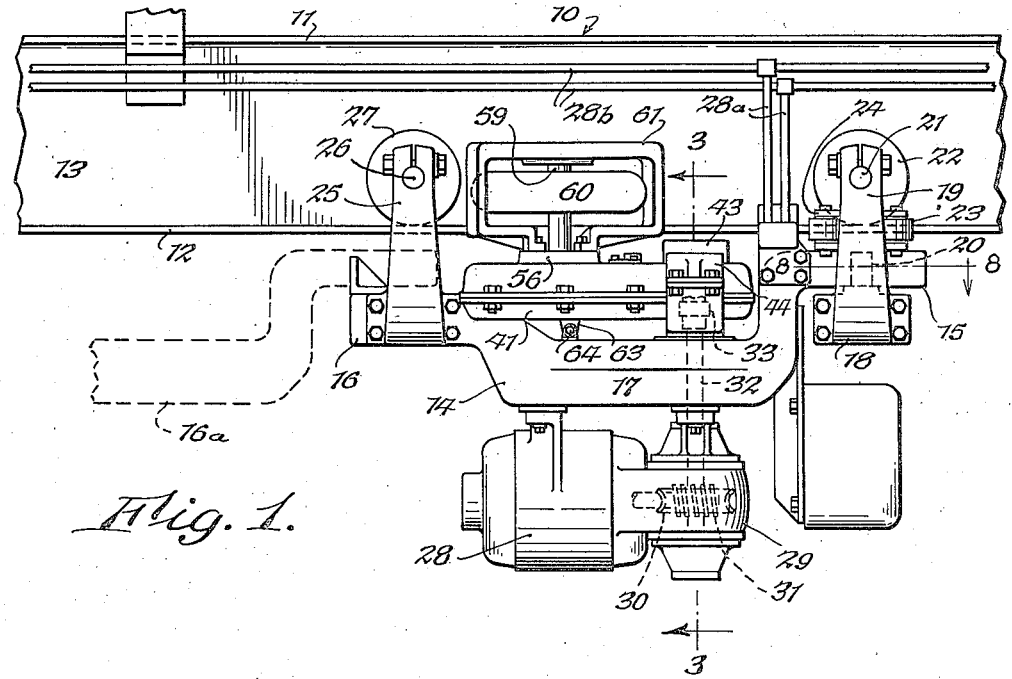
Figure 1 is a side elevational view of a tractor embodying the features of the invention.

The tractor is so designed that the suspended rail which is employed as its track may be a standard structural shape, the rail 10 with which the tractor is shown being a conventional I-beam having upper and lower flanges 11 and 12, respectively, and a web 13. As illustrated, the tractor includes a frame 14 having a front end extension 15, a rear end extension 16 and a body section 17, the end extensions being located along a median line extending longitudinally of the frame and being elevated with respect to the body section and the rear end extension being adapted to be coupled in any suitable manner to the load 16a. The front end extension 15 is suspended below the rail 10 by a trolley 18, being located between depending, spaced-apart arms 19 of the trolley and being pivotally connected to the latter by a swivel pin 20. At their upper ends the arms 19 carry horizontal, inwardly directed shafts 21. Wheels 22 on the latter overlie and ride upon the flange 12 of the rail, the said wheels preferably being mounted so that they will ride along the flange substantially midway between the marginal edges of the latter and the web 13. Preferably, the wheels 22 are guided along the flange by oppositely located pairs of rollers 23 which engage the opposite sides or edges of the rail, each pair of rollers being carried by a yoke 24 which is suitably secured to the adjacent trolley arm 19 and being spring-loaded if desired. The rear end extension 16 of the frame 14 is suspended below the rail 10 by arms 25, the upper ends of which carry inwardly directed shafts 26. Wheels 27 on the latter overlie and ride upon the lower flange of the rail, preferably tracking with the wheels of the trolley 18.

The wheels 22 and 27 serve only to support the tractor on the rail 10. They do not, nor are they intended to, guide it in its movement along the rail. Flangeless wheels may, therefore, be employed and as such wheels may be mounted so that they travel along paths spaced inwardly with respect to the marginal edges of the lower flange they do not wear or peen over such edges. Nor are they themselves subjected to the wearing action of such edges. The use of special structural shapes or reinforcing of the lower flange of the rail, as is the practice when flanged supporting wheels are employed and when the load carrying wheels are driven, is thus avoided.

The tractor is powered by an electric motor 28 which is mounted upon the underside of the body section of the frame 14, collector arms 28a which are carried by the said frame having sliding contact with conductor bars 28b carried by the rail 10. A housing 29 on one end of the motor accommodates a worm wheel 30 which meshes with and which is driven by a worm 31 on the rotor shaft of the motor, the worm wheel being fixed to the lower end of a drive shaft 32. A coupling 33 connects the upper end of the latter to a shaft 34 to which upper and lower gears 35 and 36, respectively, are fixed, the gear 36 meshing with a gear 37 which is fixed to a countershaft 38. Bearings 39 for the shaft 34 are mounted within upper and lower hubs 40 formed, or provided, upon a sectional gear housing 41, the said hubs being journaled in the sleeves 42 of upper and lower bearings 43 carried by a cross-frame 44 which is mounted on the upper side of the body section of the frame 14 in the vicinity of the end extension 15. The bearings 45 for the countershaft 38 are mounted in upper and lower hubs 46 formed, or provided, upon a sectional gear housing 47, the said hubs being journaled in sleeves 48 of upper and lower bearings 49 which are carried by the cross-frame 44.

The gear 37 (Figure 5) meshes with an idler gear 50 which in turn meshes with a gear 51, the latter being fixed to the lower end of a shaft 52 which carries a drive wheel 53. The upper end of the shaft 52 is journaled in an outboard bearing 54 which is carried by a frame 55, the latter being bolted or otherwise secured upon a boss 56 formed upon the housing 47. The boss 56 also accommodates a bearing 56a for the lower end of the shaft 52. The gear 35 meshes with an idler gear 57 (Figure 5) which in turn meshes with a gear 58. The latter is fixed to the lower end of a shaft 59 (Figure 4) which carries a drive wheel 60, the upper end of the said shaft being mounted in an outboard bearing in a frame 61 and the lower end being mounted in a bearing in the housing 41 as described in connection with the shaft 52. The wheels 53 and 60, which are driven by the two gear trains, engage opposite sides of the web 13 of the rail and are driven in opposite directions to propel the tractor along the rail 10, the web engaging portions of the wheels preferably being provided by pneumatic tires 62.

It will be noted that the housings 41 and 47, each of which carries one of the drive wheels 53 and 60 and the gear train for transmitting power to such wheel, are each mounted as a unit for pivotal movement about a vertical axis which is coincident with the axis of the shaft of the driving gear of the gear train, the housing 41 being adjustable about an axis coincident with the axis of the shaft 34 and the housing 47 being adjustable about an axis coincident with the axis of the shaft 38. Such angular adjustments, therefore, may be made freely and to any desired degree without necessitating corrections to be made in the gears of either train. In other words the driving relation of the gears in each train remains constant despite adjustments of the housings 41 and 47 and despite the fact that as a result of such adjustments one train of gears may be moved as a unit toward or away from the other.

Figure 2:
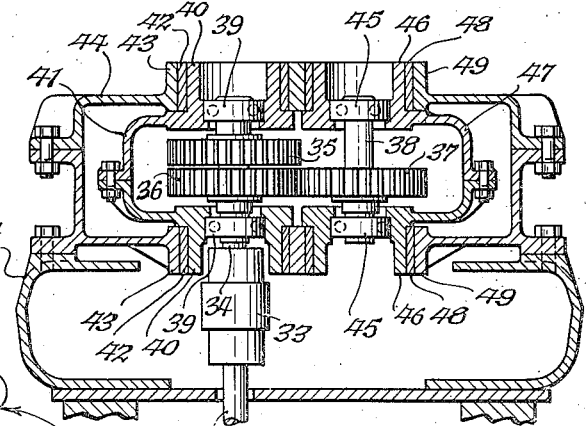
Figure 2 is an end elevation.
Figure 3:
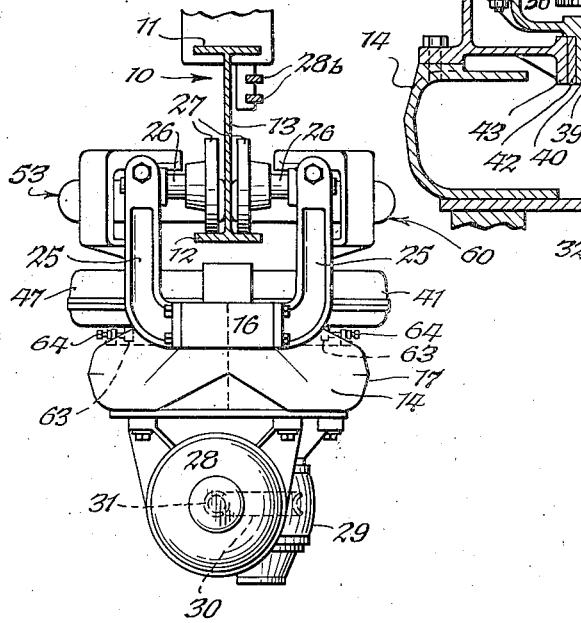
Figure 3 is an enlarged vertical section taken along line 3—3 of Figure 1.

The housings 41 and 47 are adjustable in the manner described in order that the tires of the drive wheels 53 and 60 may be caused to engage the web of the rail 10 with a pressure adequate to obtain the desired traction. A projection 63 (Figure 2) on the under side of each of the housings is engaged by a threaded element 64 which is carried by a top wall of the body section of the frame 14. Each of the elements 64 is adjustable to advance the associated housing toward, or to permit it to move away from, the web of the rail 10. The said elements may be suitably locked in any adjusted positions of the housings. In this connection it will be noted that the tires of the two drive wheels always engage the web of the rail with equal pressure and that any adjustments of one of the elements 64 automatically effects both wheels in the same degree, the adjustment of such element moving the associated housing in one direction while the resistance offered by the rail to such movement is transmitted to the frame 14 so that the latter simultaneously urges the opposite housing in the opposite direction. Traction between the drive wheels of the tractor and the web of the rail does not, therefore, depend upon the weight of the tractor and may be predetermined with respect to the load to be drawn and without adding substantially to such load or to the load upon the wheels which ride along the lower flange of the rail. Wearing and deforming of the wheels and rail flange are thus reduced to a minimum.

It will be noted that the drive wheels 53 and 60 are in the same plane as the rail 10 and turn in the same plane. The headroom required is thus reduced to a minimum and compactness and simplicity in design are achieved. Moreover, this enables the motor to be mounted under the frame in such a position that the center of gravity of the tractor will be located directly below the rail so that the weight of the tractor will tend to cause it to assume and maintain a position in which the load carrying wheels and drive wheels cooperate properly with the rail. A further advantage achieved as a result of obtaining the desired traction without the aid of the load carrying wheels is that the necessity for any particular spatial relation between the axes of these wheels and the drive wheels is avoided, the size and location of the latter being predetermined without regard to the location of the axes of the load carrying wheels.

The invention contemplates the removal of the idler gears 50 and 57 and the gears 51 and 58 and the substitution for such gears of other gears of different ratios in order to enable various tractor speeds to be obtained with respect to a particular motor speed. To this end the top and bottom walls of each housing 41 and 47 are formed with elongated slots 69 and 70 (Figures 5 and 6) for accommodating the ends of the shafts 71 which carry the gears 50 and 57. The said slots are adapted to accommodate the shafts 71 in various positions as may be determined by the sizes and locations of the gears 50 and 57 and the sizes of the gears 51 and 58. Axial and angular movements of the shafts 71 are prevented by plates 72, the marginal edges of the latter overlying side walls of the slots 69 and fitting in transverse notches formed in the ends of said shafts. The plates 72, therefore, cooperate with the shafts in any position which they may occupy in the slots 69 and 70.

In connection with the foregoing it will be noted, referring particularly to Figure 5, that the train of gears for transmitting power to the drive wheel 60 occupies a plane above that occupied by the train of gears for transmitting power to the drive wheel 53. This has the advantage that the range of speeds which can be obtained by varying the ratios of the idler gears 50 and 57 and the gears 57 and 58 which they drive is substantially increased as it enables the use of gears of a size which, if the two trains occupied the same plane, would be impossible. In other words the planar locations of the two gear trains being different, provision is made whereby when larger gears are employed the gears of one train may overlie the gears of the companion train.

From the foregoing it will be apparent that the tractor can negotiate sharp curves and steep grades without subjecting the rail to severe stresses and wearing. This is possible because of the close spacing of the driving wheels, which are only the thickness of the web apart, and of the close spacing of the supporting wheels which are spaced inwardly from the edges of the lower flange and can move freely laterally, within limits, on said flange. The supporting wheels thus carry only the weight of the tractor and do not have to guide the latter, one end of the tractor being guided by the horizontally supported wheels carried by the trolley 18 while the opposite end is guided by the drive wheels 53 and 60 which also stabilize the tractor and counteract any tendency of the latter to sway. The use of a pair of driving wheels in the manner described also has the advantage that excessive wearing and destruction of the tires of the driving wheels by slippage of the tires on the wheels is reduced to a minimum, the forces causing such wearing and slippage being substantially one-half the corresponding forces to which the tire of a tractor having a single wheel drive would be subjected.

I claim as my invention:

1. A monorail tractor for overhead carrier systems including supporting wheels which ride upon a flange of a rail of such a system at opposite sides of a vertical web of the rail, cooperating traction wheels having compressible tires which engage opposite sides of said web, the axes of said traction wheels being normal to the axes of said supporting wheels, housings pivotally mounted below said rail, shafts which extend upwardly from said housings and which carry said traction wheels, means acting against said housings for causing said traction wheels to engage said web with a predetermined pressure, a motor, and transmission means connecting said motor and said shafts for driving said traction wheels in opposite directions to propel said tractor along said rail, said transmission means including two gear trains, one for driving each shaft and each of which is enclosed in one of said housings.

2. A monorail tractor for overhead carrier systems including a frame, supporting wheels which are carried by said frame and which ride upon a flange of a rail of such a system, cooperating traction wheels which frictionally engage opposite sides of said rail, the axes of said traction wheels being normal to the axes of said supporting wheels, housings pivotally mounted on said frame below said rail, shafts which extend upwardly from said housings for carrying said traction wheels, a motor, and transmission means connecting said motor to said shafts for driving said traction wheels in opposite directions, said transmission means including two gear trains, one of which is enclosed in each of said housings.

3. A monorail tractor for overhead carrier systems including a frame, supporting wheels which are carried by said frame and which ride upon a flange of a rail of such a system at opposite sides of a vertical web of the rail, cooperating traction wheels which frictionally engage opposite sides of said web, the axes of said traction wheels being normal to the axes of said supporting wheels, housings pivotally mounted on said frame below said rail, shafts extending upwardly from said housings for carrying said traction wheels, a motor, and transmission means connecting said motor to said shafts for driving said traction wheels in opposite directions, said transmission means including two gear trains, one of which is enclosed in each of said housings, the axis of one gear of each of said trains being coincident with the axis about which its housing pivots.

4. A monorail tractor for overhead carrier systems including a frame, supporting wheels which are carried by said frame and which ride upon a flange of a rail of such a system, cooperating traction wheels which frictionally engage opposite sides of said rail, the axes of said traction wheels being normal to the axes of said supporting wheels, housings pivotally mounted on said frame below said rail, shafts extending upwardly from said housings for carrying said traction wheels, a motor, and transmission means including two gear trains for connecting said motor to said shafts for driving said traction wheels in opposite directions, one of said gear trains being enclosed in each of said housings and the gears of one train being located in a different plane than the gears of the other, whereby the gears of one train may overlie, or be moved to positions in which they overlie, the gears of the companion train without interference between the gears of the two trains.

5. A monorail tractor for overhead carrier systems including a frame, supporting wheels which are carried by said frame and which ride upon a flange of a rail of such a system, cooperating traction wheels which frictionally engage opposite sides of said rail, the axes of said traction wheels being normal to the axes of said supporting wheels, housings pivotally mounted on said frame below said rail, shafts extending upwardly from said housings for carrying said traction wheels, a motor, transmission means including two gear trains for connecting said motor to said shafts for driving said traction wheels in opposite directions, one of said gear trains being enclosed in each of said housings and the gears of one train being located in a different plane than the gears of the other, whereby the gears of one train may overlie, or be moved to positions in which they overlie, the gears of the companion train without interference between the gears of the two trains, and means for adjusting the positions of said housings to vary in substantially equal degree the pressure with which said traction wheels are caused to engage said rail.

6. A monorail tractor for overhead carrier systems including a frame, supporting wheels which are carried by said frame and which ride upon a flange of a rail of such a system, cooperating traction wheels which frictionally engage opposite sides of said rail, the axes of said traction wheels being normal to the axes of said supporting wheels, housings pivotally mounted on said frame below said rail, shafts extending upwardly from said housings for carrying said traction wheels, a motor, transmission means connecting said motor to said shafts for driving said traction wheels in opposite directions, said transmission means including two gear trains, one of which is carried by each of said housings and each of which includes an idler gear and a shaft on which said gear is mounted, the axis of one gear of each of said trains being coincident with the axis about which its housing pivots, means for mounting the shafts of said idler gears in various positions along the lines of the axes of the gears of said trains in order to enable the use of gears of different ratios in said trains and means for adjusting said housings to obtain the desired traction between said traction wheels and said rail.

7. A monorail tractor for overhead carrier systems including a frame, supporting wheels which are carried by said frame and which ride upon a flange of a rail of such a system, cooperating traction wheels which frictionally engage opposite sides of said rail, the axes of said traction wheels being normal to the axes of said supporting wheels, housings pivotally mounted on said frame below said rail, shafts extending upwardly from said housings for carrying said traction wheels, a motor mounted upon the underside of said frame so that its rotor shaft is normal to the axes of said supporting wheels and also normal to the axes of said traction wheels, and transmission means connecting said motor to said shafts for driving said traction wheels in opposite directions, said transmission means including two gear trains, one of which is enclosed in each of said housings, and a vertical drive shaft.

8. A monorail tractor for overhead carrier systems including a supporting frame, trolleys for suspending the front and rear ends of said frame below said rail, said trolleys having wheels which ride upon a horizontal flange of a rail of such a system between the marginal edges of said flange and a vertical web of the rail, cooperating traction wheels which frictionally engage opposite sides of said web, the axes of said traction wheels being normal to the axes of said supporting wheels, housings pivotally mounted on said frame below said rail, shafts extending upwardly from said housings for carrying said traction wheels, a motor, and transmission means connecting said motor to said shafts for driving said traction wheels in opposite directions, said transmission means including two gear trains, one of which is carried by each of said housings.

9. A monorail tractor for overhead carrier systems including a frame, supporting wheels which are carried by said frame and which ride upon a flange of a rail of such a system, cooperating traction wheels which frictionally engage opposite sides of said rail, the axes of said traction wheels being normal to the axes of said supporting wheels, housings pivotally mounted on said frame below said rail, shafts extending upwardly from said housings for carrying said traction wheels, a motor, transmission means connecting said motor to said shafts for driving said traction wheels in opposite directions, said transmission means including two gear trains, one of which is carried by each of said housings, the axis of one gear of each of said trains being coincident with the axis about which its housing pivots, and means for adjusting the positions of said housings to cause said traction wheels to engage said rail with the desired pressure.

10. A monorail tractor for overhead carrier systems including a frame, flangeless, load-supporting wheels for said frame which ride upon a flange of a rail of such a system at opposite sides of a vertical web of said rail, cooperating traction wheels which engage opposite sides of said rail, the axes of said traction wheels being normal to the axes of said load-supporting wheels, supports for said traction wheels carried by said frame and mounted for adjustable movement in a lateral direction with respect to said frame, a motor connected to said traction wheels for driving said tractor along said rail, said traction wheels also serving to guide a pair of said load-supporting wheels so that they traverse predetermined paths along said flange, and means for causing said traction wheels to engage said rail with a predetermined pressure.

11. A monorail tractor for overhead carrier systems including a frame, two pairs of flangeless, load-supporting wheels which ride upon a flange of a rail of such a system at opposite sides of a vertical web of said rail and from which said frame is suspended, a swiveled trolley suspended from one pair of said wheels, companion pairs of guide rollers which are carried by said trolley and which engage opposite sides of said rail to guide said last mentioned pair of load-supporting wheels along said flange, cooperating traction wheels which engage opposite sides of said rail, the axes of said traction wheels being normal to the axes of said load-supporting wheels, supports for said traction wheels carried by said frame and mounted for adjustable movement in a lateral direction with respect to said frame, a motor connected to said traction wheels for driving said tractor along said rail, said traction wheels serving to guide the other pair of said load-supporting wheels so that they traverse predetermined paths along said flange, and means, whereby said traction wheels may be caused to engage said rail with a predetermined pressure.

12. A monorail tractor for overhead carrier systems including a frame, flangeless, load-supporting wheels which ride upon a flange of a rail of such a system at opposite sides of a vertical web of said rail and from which said frame is suspended, cooperating traction wheels which engage opposite sides of said rail, the axes of said traction wheels being normal to the axes of said load-supporting wheels, housings pivotally mounted on said frame below said rail, shafts extending upwardly from said housings for carrying said traction wheels, a motor for driving said tractor along said rail, said traction wheels also serving to guide a pair of said load-supporting wheels so that they traverse predetermined paths along said flange, and transmission means connecting said motor to said shafts, said transmission means including two gear trains, one of which is enclosed in each of said housings, the axis of the leading gear of each gear train being coincident with the axis about which the housing for said gear train pivots.

13. A monorail tractor for overhead carrier systems including a frame, two pairs of flangeless, load-supporting wheels which ride upon a flange of a rail of such a system at opposite sides of a vertical web of said rail and from which said frame is suspended, a swiveled trolley suspended from one pair of said wheels, companion pairs of guide rollers which are carried by said trolley and which engage opposite sides of said rail to guide said last mentioned pair of load-supporting wheels along said flange, cooperating traction wheels which engage opposite sides of said rail, the axes of said traction wheels being normal to the axes of said load-supporting wheels, housings pivotally mounted at their inner ends in said frame below said rail, shafts extending upwardly from said housings for carrying said traction wheels, means for adjusting the outer ends of said housing to cause said traction wheels to engage said rail with a predetermined pressure, a motor for driving said tractor along said rail, said traction wheels also serving to guide the other pair of said load-supporting wheels so that they traverse predetermined paths along said flange, and transmission means connecting said motor to said shafts, said transmission means including two gear trains, one of which is enclosed in each of said housings, the axis of the leading gear of each gear train being coincident with the axis about which the housing for said gear train pivots.

14. A monorail tractor for overhead carrier systems including a frame, load-supporting wheels which ride upon a flange of a rail of such a system at opposite sides of a vertical web of said rail and from which the opposite ends of said frame are suspended, cooperating traction wheels which engage opposite sides of said rail, the axes of said traction wheels being normal to the axes of said load-supporting wheels, a motor mounted on the under side of said frame and connected to said traction wheels for driving said tractor along said rail, companion housings pivotally mounted at their inner ends upon the upper side of said frame below said rail, transmission means connecting said motor to said traction wheels, said transmission means including two gear trains, one of which is enclosed in each of said housings, the axis of the inner gear of each gear train being coincident with the axis about which the housing for said gear train pivots, a vertical shaft driven by the outer gear of each of said gear trains, said shafts extending upwardly at opposite sides of said rail and carrying said traction wheels, and means acting against said housings for causing said traction wheels to engage said rail with a predetermined pressure.

15. A monorail tractor for overhead carrier systems including a frame, trolleys for suspending the front and rear ends of said frame below a rail of said system, said trolleys having flangeless wheels which ride upon a flange of said rail at opposite sides of a vertical web thereof, cooperating traction wheels, supports for said traction wheels carried by said frame and mounted for adjustable movement in a lateral direction with respect to said frame, means on said frame for acting upon said supports to cause the traction wheels to engage frictionally opposite sides of said web, the axes of said traction wheels being normal to the axes of said supporting wheels, a motor mounted on said frame and gearing operatively connecting said motor and said traction wheels.

16. A monorail tractor for overhead carrier systems including a frame, trolleys for suspending the front and rear ends of said frame below a rail of said system, said trolleys having flangeless wheels which ride upon a flange of said rail at opposite sides of a vertical web thereof, cooperating traction wheels, housings pivotally mounted on the upper side of said frame below said flange, shafts extending upwardly from said housings for carrying said traction wheels, a motor mounted on the under side of said frame, a gear train in each of said housings connecting said motor with one of said shafts, and means on said frame for acting against said housings to cause said traction wheels to engage frictionally the opposite sides of said web, the axis about which each of said housings may pivot in response to said last-mentioned means being coincident with the axis of one of the gears in the train with which the housing is associated.

17. A monorail tractor for overhead carrier systems including a frame, trolleys for suspending the front and rear ends of said frame below a rail of said system, said trolleys having flangeless wheels which ride upon a flange of said rail at opposite sides of a vertical web thereof, cooperating traction wheels, housings pivotally mounted on the upper side of said frame below said flange, drive shafts for said wheels carried by and extending upwardly from said housings, outboard bearings for the upper ends of said shafts, brackets which are mounted on said housings and which carry said bearings, a motor mounted on the under side of said frame, a gear train in each of said housings connecting said motor with one of said shafts, and means on said frame for acting against said housings to cause said traction wheels to engage frictionally the opposite sides of said web, the axis about which each of said housings may pivot in response to said last mentioned means being coincident with the axis of one of the gears in the train with which the housing is associated.

18. A monorail tractor for overhead carrier systems including a frame, trolleys for suspending the front and rear ends of said frame below a rail of said system, said trolleys having flangeless wheels which ride upon a flange of said rail at opposite sides of a vertical web thereof, the front trolley having a swivel mounting about a vertical axis, companion pairs of guide rollers carried by said front trolley and engaging opposite sides of said rail to guide the front pair of load-supporting wheels along the flange of the rail, cooperating traction wheels, supports for said traction wheels carried by said frame and mounted for adjustable movement in a lateral direction with respect to said frame, means for acting upon said supports to cause the traction wheels to engage frictionally opposite sides of said web, the axes of said traction wheels being normal to the axes of said supporting wheels, said traction wheels also serving to guide the rear pair of load-supporting wheels along said flange, a motor mounted on said frame and gearing operatively connecting said motor and said traction wheels.

GEORGE F. GOGA.